US009742541B2

(12) United States Patent
Sorrentino

(10) Patent No.: US 9,742,541 B2
(45) Date of Patent: Aug. 22, 2017

(54) USER EQUIPMENT, A RADIO BASE STATION, RBS, AND METHODS THEREIN FOR TRANSMITTING A SUBFRAME COMPRISING AT LEAST TWO REFERENCE SIGNALS, RSS, TO THE RBS

(71) Applicant: TELEFONAKTIEBOLAGET L M ERICSSON (PUBL), Stockholm (SE)

(72) Inventor: Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 234 days.

(21) Appl. No.: 14/357,925

(22) PCT Filed: Nov. 14, 2012

(86) PCT No.: PCT/SE2012/051258
§ 371 (c)(1),
(2) Date: May 13, 2014

(87) PCT Pub. No.: WO2013/074031
PCT Pub. Date: May 23, 2013

(65) Prior Publication Data
US 2014/0307699 A1    Oct. 16, 2014

Related U.S. Application Data

(60) Provisional application No. 61/559,270, filed on Nov. 14, 2011.

(51) Int. Cl.
*H04L 5/00* (2006.01)
*H04L 25/02* (2006.01)
(Continued)

(52) U.S. Cl.
CPC .......... *H04L 5/0051* (2013.01); *H04L 5/0007* (2013.01); *H04L 25/0226* (2013.01);
(Continued)

(58) Field of Classification Search
CPC . H04L 5/0051; H04L 25/0226; H04L 5/0007; H04L 27/2611; H04L 27/2613
See application file for complete search history.

(56) References Cited

U.S. PATENT DOCUMENTS

2006/0280273 A1* 12/2006 Mueller-Weinfurtner ......... H04B 1/7087
375/368
2007/0060161 A1*  3/2007 Chindapol ............ H04L 1/0001
455/450
(Continued)

FOREIGN PATENT DOCUMENTS

WO    2011082829 A1    7/2011

OTHER PUBLICATIONS

3GPP, 3rd Generation Partnership Project; Technical Specification Group Radio Access Network; Evolved Universal Terrestrial Radio Access (E-UTRA); Physical Channels and Modulation (Release 10), 3GPP TS 36.211, V10.7.0, 2013, 101 pages.
(Continued)

*Primary Examiner* — Walter Divito
*Assistant Examiner* — Anthony Luo
(74) *Attorney, Agent, or Firm* — Rothwell, Figg, Ernst & Manbeck, P.C.

(57) ABSTRACT

A method in a UE comprises: receiving, from an RBS, information regarding a base sequence and a first phase rotation speed of the base sequence; determining an order, L, of the IFDMA, indicating a spacing between subcarriers over which the base sequence is to be mapped in the frequency domain; generating an RS-specific second phase rotation speed of the base sequence based on a CS pseudo random offset; increasing at least the second phase rotation speed based on L; combining the first and the increased second phase rotation speeds to obtain a third phase rotation speed, and performing phase rotation of the base sequence based on the third phase rotation speed; and mapping the
(Continued)

phase rotated base sequence to every L:th subcarrier of the RSs, and transmitting the RSs.

21 Claims, 10 Drawing Sheets

(51) Int. Cl.
 *H04L 27/26* (2006.01)
 *H04W 72/04* (2009.01)
(52) U.S. Cl.
 CPC ...... *H04L 27/2611* (2013.01); *H04L 27/2613* (2013.01); *H04W 72/04* (2013.01)

(56) References Cited

U.S. PATENT DOCUMENTS

| | | | | |
|---|---|---|---|---|
| 2009/0181692 | A1* | 7/2009 | Gaal | H04J 13/16 455/452.2 |
| 2011/0211546 | A1* | 9/2011 | Hooli | H04L 1/1671 370/329 |
| 2011/0286548 | A1* | 11/2011 | Robert Safavi | H04L 5/0023 375/295 |

OTHER PUBLICATIONS

3rd Generation Partnership Project; Technical Specification Group Radio Access Network; Evolved Universal Terrestrial Radio Access (E-UTRA); Physical Channels and Modulation (Release 10), 3GPP TS 36.211 V10.3.0, 2011, 84 pages.

* cited by examiner

| Cyclic Shift Field in uplink-related DCI format [3] | $n_{\text{DMRS},\lambda}^{(2)}$ | | | | | | |
|---|---|---|---|---|---|---|---|
| | $\lambda = 0$ | $\lambda = 1$ | $\lambda = 2$ | $\lambda = 3$ | | | |
| 000 | 0 | 6 | 3 | 9 | | | |
| 001 | 6 | 0 | 9 | 3 | | | |
| 010 | 3 | 9 | 6 | 0 | | | |
| 011 | 4 | 10 | 7 | 1 | | | |
| 100 | 2 | 8 | 5 | 11 | | | |
| 101 | 8 | 2 | 11 | 5 | | | |
| 110 | 10 | 4 | 1 | 7 | | | |
| 111 | 9 | 3 | 0 | 6 | | | |

Table 1. Mapping of Cyclic Shift Field in uplink-related DCI format to $n_{\text{DMRS},\lambda}^{(2)}$.

Table 2: Mapping of *cyclicShift* to $n_{\text{DMRS}}^{(1)}$ values.

| cyclicShift | $n_{\text{DMRS}}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Fig. 4b

USER EQUIPMENT, A RADIO BASE STATION, RBS, AND METHODS THEREIN FOR TRANSMITTING A SUBFRAME COMPRISING AT LEAST TWO REFERENCE SIGNALS, RSS, TO THE RBS

CROSS REFERENCE TO RELATED APPLICATION(S)

This application is a 35 U.S.C. §371 National Phase Entry Application from PCT/SE2012/051258, filed Nov. 14, 2012, designating the United States, and also claims the benefit of U.S. Provisional Application No. 61/559,270, filed Nov. 14, 2011. The disclosures of both applications are incorporated herein in their entirety by reference.

TECHNICAL FIELD

The present disclosure relates to uplink transmission of Demodulation Reference Signals, DMRSs, and in particular to methods and arrangements for obtaining DMRS orthogonality between legacy User Equipments, UEs, and UEs employing Interleaved Frequency Domain Multiple Access, IFDMA, on DMRS.

BACKGROUND

An LTE network is designed to support UEs from different 3GPP releases, i.e. Rel-8/9/10/11, in a backward compatible way. One of the LTE network design objective is to enable co-scheduling of such UEs in time, frequency and space (Multiple User—Multiple Input Multiple Output, MU-MIMO) dimensions with as few scheduling constraints as possible.

Furthermore, the LTE standard should be able to support various and flexible deployments. Some examples of expected deployments for modern LTE networks (Rel-11 and beyond) include, e.g.:
 Macro-deployments, where large cells are typically divided into independent sectors,
 HetNet-deployments, where pico-cells are deployed within the coverage of macro-cells in order, e.g., to improve coverage for high data rate UEs, and
 Hotspot scenarios where an access point serves a small area with high throughput need.

A "cell" is characterized in LTE by a "cell-ID" and the carrier frequency, which affects several cell-specific algorithms and procedures. A cell is a coverage area of a Radio Base Station, RBS, or eNodeB. An RBS or eNodeB may be associated with a plurality of cells.

The UL of LTE is designed assuming coherent processing, i.e., the receiver is assumed to be able to estimate the radio channel from a transmitting UE and to take advantage of such information in the detection phase. Therefore, each transmitting UE sends a Reference Signal, RS, associated to each UL data channel, i.e. the Physical Uplink Shared Channel, PUSCH.

RSs from different UEs within the same cell potentially interfere with each other and, assuming synchronized networks, even with RSs originated by UEs in neighbouring cells. In order to limit the level of interference between RSs, different techniques have been introduced in different LTE releases in order to allow orthogonal or semi-orthogonal RSs. The design principle of LTE assumes orthogonal RSs within each cell and semi-orthogonal RS among different cells (even though orthogonal RSs can be achieved for aggregates of cells by so called "sequence planning").

Each RS is characterized by a group-index and a sequence-index, which define the so called base-sequence. Base sequences are cell-specific in Rel-8/9/10 and they are a function of the cell-ID. Different base sequences are semi-orthogonal. The RS for a given UE is only transmitted on the same bandwidth of Physical Uplink Shared Channel, PUSCH, and the base sequence is correspondingly generated so that the RS signal is a function of the PUSCH bandwidth. One example is illustrated in FIG. 1, where DMRS 1 and DMRS 2 represent respective Demodulation Reference Signal, DMRS, of different UEs. For each subframe, 2 RSs are transmitted, one per slot, as indicated in FIG. 2.

On top of the base sequence, a phase shift, CS, is applied in frequency domain and an orthogonal cover code, OCC, is applied in time domain over the slots. Orthogonal RS can be achieved by use of CS in Rel-8/9 or by CS in conjunction with OCC in Rel-10 and later releases.

CS is a method to achieve orthogonality based on cyclic time shifts (which correspond to phase rotations in frequency domain), under certain propagation conditions, among RSs generated from the same base sequence. Only 8 different CS values can be signalled by scheduling grants in Rel-8/9/10, even though in practice less than 8 orthogonal RS can be achieved depending on channel propagation properties. Even though CS is effective in multiplexing RSs assigned to fully overlapping bandwidths, orthogonality is lost when the bandwidths differ and/or when the interfering UEs employ another base sequence.

In order to increase interference randomization, a pseudo-random offset to the CS values is applied (CS hopping). The randomization pattern is cell-specific up to Rel-10 and UE specific in Rel-11. A different CS offset is in general applied in each slot and it is known at both UE and RBS/eNodeB sides, so that it can be compensated at the receiver side during channel estimation. The pseudo-random CS offset is combined with the signalled UE-specific CS offset for each slot, and a modulo 12 operation is performed in order to avoid exceeding the maximum phase rotation speed. CS randomization is always enabled and generates random cell-specific CS offsets per slot. The pseudo-random CS pattern is a function of the cell-ID and is thus cell-specific.

OCC is a multiplexing technique based on orthogonal time domain codes, operating on the 2 RSs provided for each UL subframe. The OCC code [1-1] is able to suppress an interfering RS as long as its contribution after the RBS/eNodeB matched filter is identical on both RSs of the same subframe. Similarly, the OCC code [1 1] is able to suppress an interfering RS as long as its contribution after the RBS/eNodeB matched filter has opposite sign respectively on the two RSs of the same subframe.

While base-sequences are assigned in a semi-static fashion, CS and OCC are UE specific and dynamically assigned as part of the scheduling grant for each UL PUSCH transmission.

One of the main innovations in the UL for LTE Rel-10 is the introduction of Multi-Antenna techniques which can significantly increase the data rates and reliability of a wireless communication system. The performance is in particular improved if both the transmitter and the receiver are equipped with multiple antennas. This results in a multiple-input multiple-output, MIMO, communication channel and such systems and/or related techniques are commonly referred to as MIMO.

LTE Rel.10 supports a spatial multiplexing mode (single-user MIMO or SU-MIMO) in the communication from a single UE to the RBS/eNodeB. SU-MIMO is aimed for high data rates in favourable channel conditions. SU-MIMO consists of the simultaneous transmission of multiple data streams on the same bandwidth, where each data stream is usually termed as a layer. Multi-antenna techniques, such as linear precoding, are employed at the transmitter in order to differentiate the layers in the spatial domain and allow the recovering of the transmitted data at the receiver side. Typically, an individual demodulation reference signal, DMRS, is transmitted for each transmission layer. Alternatively, an individual Sounding Reference Signal, SRS, may be transmitted for each transmit antenna, e.g., for channel sounding purposes.

Another MIMO technique supported by LTE Rel.10 is MU-MIMO, where multiple UEs belonging to the same cell are completely or partly co-scheduled on the same bandwidth and time slots. Each UE in the MU-MIMO configuration may possibly transmit multiple layers, thus operating in SU-MIMO mode. In order to achieve good performance, DMRS for the co-scheduled UEs may be orthogonalized for MU-MIMO applications. One possible means for obtaining orthogonality is to apply OCCs.

One possible improvement to LTE DMRS is to apply IFDMA, which has been discussed in 3GPP contribution R1-100262, "Analysis and evaluation of UL DM RS design for LTE-A scenarios". IFDMA is a multiplexing technique for OFDM signals, consisting of an interleaved mapping of the signal to the subcarriers at the input of the Inverse Fast Fourier Transform, IFFT, OFDM modulator at the transmitter. The signal is mapped to each L:th subcarrier in a comb fashion, where L is the IFDMA order. Corresponding demapping is performed at the receiver side. With IFDMA up to L L-order UEs may be multiplexed on overlapping bandwidth, as longs as each UE is assigned a different subcarrier offset in the comb mapping, so that its signal does not overlap in frequency domain with the signal from other UEs. FIG. 3 is a schematic illustration of IFDMA RS multiplexing of two IFDMA enabled UEs, UE1 and UE2 applying IFDMA of order 2.

OCC may be applied to the IFDMA modulated DMRS in the slots of a subframe.

In case new UEs supporting IFDMA are introduced in an existing network, a problem of compatibility with existing non-IFDMA UEs arises. In order to achieve orthogonal DMRS between new and non-IFDMA (legacy) UEs, a candidate solution is to employ OCC. However, due to CS hopping patterns, OCC is not effective in this case and orthogonality may not be achieved.

SUMMARY

The object is to obviate at least some of the problems outlined above. In particular, it is an object to provide a UE and a method performed by a UE for transmitting a subframe comprising at least two RSs to an RBS, Further it is an object to provide an RBS and a method performed by an RBS for receiving a subframe comprising at least two RSs from a UE. These objects and others may be obtained by providing a UE and an RBS respectively and a method in a UE and an RBS respectively according to the independent claims attached below.

According to an aspect, a method performed by a UE for transmitting a subframe comprising at least two RSs to an RBS is provided. The UE is operable in a wireless communication system employing OFDM and the wireless communication system employs Cyclic Shift, CS. The UE supports IFDMA. The method comprises, for each RS of the subframe to be transmitted, receiving, from the RBS, information regarding a base sequence and a first phase rotation speed of the base sequence in the frequency domain; and determining an order, L, of the IFDMA, indicating a spacing between subcarriers over which the base sequence is to be mapped in the frequency domain. The method further comprises generating a RS-specific second phase rotation speed of the base sequence in the frequency domain based on a CS pseudo random offset; and increasing at least the second phase rotation speed of the base sequence in the frequency domain based on the order of the IFDMA, L. The method also comprises combining the first and the increased second phase rotation speeds of the base sequence in the frequency domain to obtain a third phase rotation speed, and performing phase rotation of the base sequence based on the third phase rotation speed. Still further, the method comprises mapping the phase rotated base sequence to every L:th subcarrier of the RSs, and transmitting the RSs.

According to an aspect, a method performed by an RBS, operable in a wireless communication system employing OFDM, for receiving a subframe comprising at least two Reference Signals, RSs, from a UE is provided. The wireless communication system employs Cyclic Shift, CS, in a frequency domain, and the UE supports IFDMA. The method comprises receiving the subframe from the UE; and determining an order, L, of the IFDMA, indicating a spacing between subcarriers over which the base sequence has been mapped in the frequency domain. The method further comprises generating a RS-specific second phase rotation speed of the base sequence in the frequency domain based on a CS pseudo random offset; and increasing at least the second phase rotation speed of the base sequence in the frequency domain based on the order of the IFDMA, L. The method also comprises combining the first and the increased second phase rotation speeds of the base sequence in the frequency domain to obtain a third phase rotation speed; and performing phase rotation of the base sequence based on the third phase rotation speed. Still further, the method comprises retrieving the phase rotated base sequence and RSs from every L:th subcarrier, and estimating the channel based on the retrieved base sequence and RSs.

According to yet an aspect, a UE operable in a wireless communication system employing OFDM and adapted for transmitting a subframe comprising at least two RSs to an RBS is provided. The wireless communication system employs Cyclic Shift, CS and the UE supports IFDMA. The UE comprises a receiving unit adapted to, for each RS of the subframe to be transmitted, receive from the RBS, information regarding a base sequence and a first phase rotation speed of the base sequence in the frequency domain. The UE further comprises a determining unit adapted to determine an order, L, of the IFDMA, indicating a spacing between subcarriers over which the base sequence is to be mapped in the frequency domain; and a generating unit adapted to generate a RS-specific second phase rotation speed of the base sequence in the frequency domain based on a CS pseudo random offset. The UE also comprises an increasing unit adapted to increase at least the second phase rotation speed of the base sequence in the frequency domain based on the order of the IFDMA, L; and a combining unit adapted to combine the first and the increased second phase rotation speeds of the base sequence in the frequency domain to obtain a third phase rotation speed. The UE further comprises a phase rotation unit adapted to perform phase rotation of the base sequence based on the third phase rotation speed; and a mapping unit adapted to map the phase rotated base sequence to every L:th subcarrier of the RSs. The UE also comprises a transmitting unit adapted to transmit the RSs.

According to still an aspect, an RBS operable in a wireless communication system employing OFDM and adapted for receiving a subframe comprising at least two RSs from UE is provided. The wireless communication system employs Cyclic Shift, CS, in a frequency domain and the UE supports IFDMA. The RBS comprises a receiving unit adapted to receive the subframe from the UE; and a determining unit adapted to determine an order, L, of the IFDMA, indicating a spacing between subcarriers over which the base sequence has been mapped in the frequency domain. The RBS further comprises a generating unit adapted to generate a RS-specific second phase rotation speed of the base sequence in the frequency domain based on a CS pseudo random offset. The RBS also comprises an increasing unit at least the second phase rotation speed of the base sequence in the frequency domain based on the order of the IFDMA, L; and a combining unit adapted to combine the first and the increased second phase rotation speeds of the base sequence in the frequency domain to obtain a third phase rotation speed. Still further, the RBS comprises a phase rotation unit adapted to perform phase rotation of the base sequence based on the third phase rotation speed; and a retrieving unit adapted to retrieve the phase rotated base sequence and the RSs from every L:th subcarrier. The RBS also comprises an estimating unit adapted to estimate the channel based on the retrieved base sequence.

The UE, the RBS and the respective method therein may have several advantages. One advantage is that RS orthogonality between legacy UEs (not supporting IFDMA) and UEs supporting IFDMA may be achieved.

BRIEF DESCRIPTION OF DRAWINGS

Embodiments will now be described in more detail in relation to the accompanying drawings, in which:

FIG. 4b is an illustration of two tables of parameters for determining a CS.

DETAILED DESCRIPTION

Briefly described, a UE and a method therein are provided for transmitting a subframe comprising at least two RSs to an RBS, wherein the UE supports Interleaved Frequency Domain Multiple Access, IFDMA. The UE being operable in a wireless communication system employing Orthogonal Frequency Division Multiplexing, OFDM, the wireless communication system employing Cyclic Shift, CS. Further, an RBS and a method therein are provided for receiving a subframe comprising at least two RSs from a UE. The RBS being operable in a wireless communication system employing OFDM, the wireless communication system employing CS.

The present disclosure is focused on the uplink, UL, of a $3^{rd}$ Generation Partnership Project, 3GPP, Long Term Evolution, LTE, Release 11 network, even though it may be also be applied to the downlink, DL, as well as to other communication protocols.

Note that although terminology from 3GPP LTE-Advanced has been used in this disclosure to exemplify the invention, this should not be seen as limiting the scope of the embodiments to only the aforementioned system. Other wireless systems, including WCDMA, WiMax, UMB and GSM, may also benefit from exploiting the ideas covered within this disclosure.

Also note that terminology, such as base station and UE, used in this disclosure should be considering non-limiting and does in particular not imply a certain hierarchical relation between the two; in general "base station" could be considered as device 1 and "UE" device 2, when these two devices communicate with each other over some radio channel.

The present disclosure discloses a method performed by a UE for scaling the phase rotation speed associated to the pseudo-random CS hopping pattern in case of IFDMA modulated RS in a way that allows orthogonalization of IFDMA RSs and non-IFDMA (legacy) RSs.

An exemplifying embodiment of such a method performed by a UE will now be described with reference to FIG. 4a. The UE is operable in a wireless communication system employing OFDM, and the UE supports IFDMA.

Figure 4A:
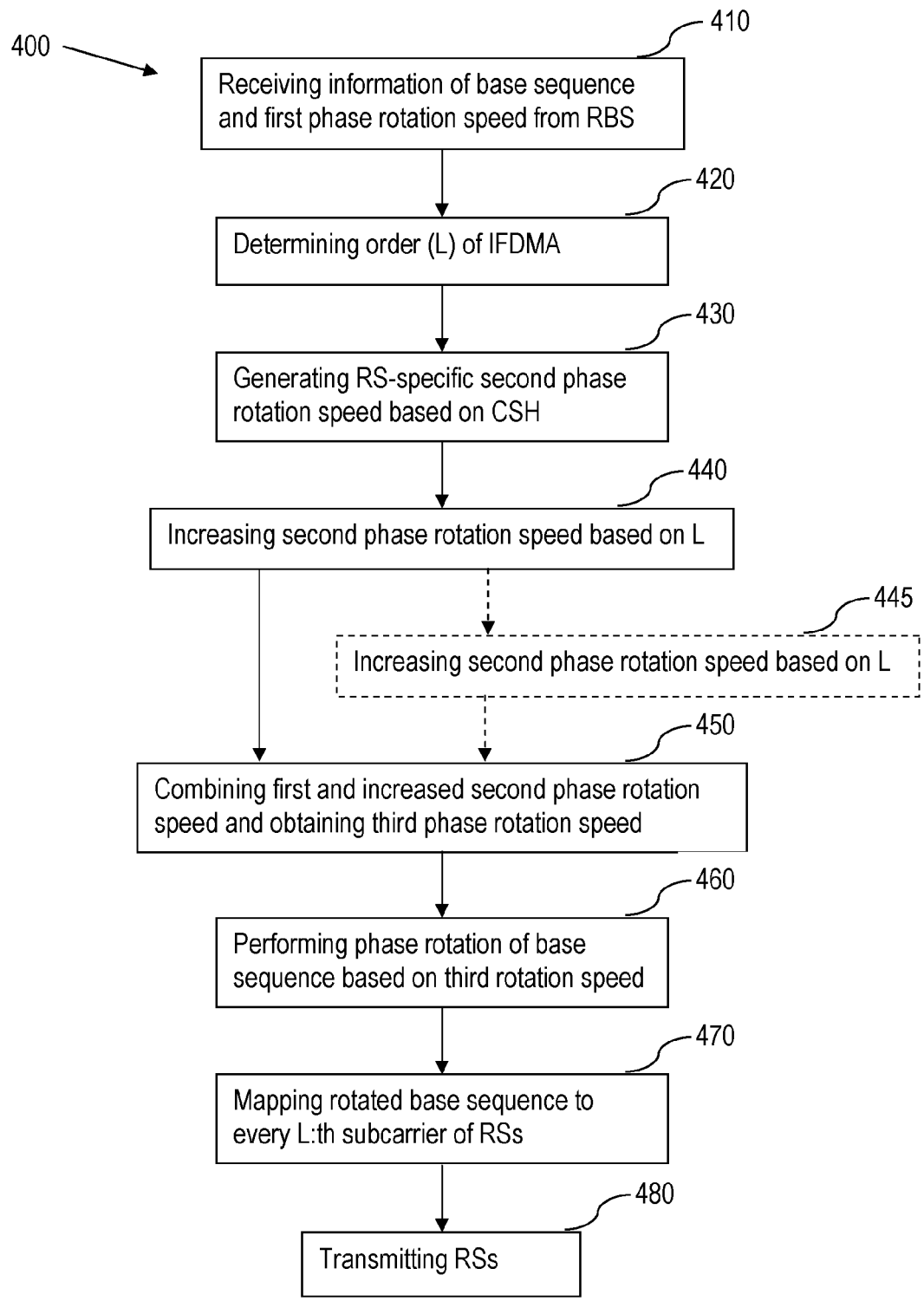
FIG. 4a is a flowchart of a method performed by a UE for transmitting a subframe comprising at least two Reference Signals, RSs, to a Radio Base Station, RBS, according to an exemplifying embodiment.

FIG. 4a illustrates the method, for transmitting a subframe comprising at least two RSs to the RBS, comprising for each RS of the subframe to be transmitted receiving 410, from the RBS, information regarding a base sequence and a first phase rotation speed of the base sequence in the frequency domain; and determining 420 an order, L, of the IFDMA, indicating a spacing between subcarriers over which the base sequence is to be mapped in the frequency domain. The method further comprises generating 430 a RS-specific second phase rotation speed of the base sequence in the frequency domain based on a CS pseudo random offset; and increasing 440 at least the second phase rotation speed of the base sequence in the frequency domain based on the order of the IFDMA, L. The method also comprises combining 450 the first and the increased second phase rotation speeds of the base sequence in the frequency domain to obtain a third phase rotation speed, and performing 460 phase rotation of the base sequence based on the third phase rotation speed. Still further, the method comprises mapping 470 the phase rotated base sequence to every L:th subcarrier of the RSs, and transmitting 480 the RSs.

The UE receives information from the RBS in different manners. One example is the UE receiving broadcasted control information, from the RBS, on different control channels. The broadcasted information may be received by all UEs which are located within a cell of the RBS. Another example is the UE receiving scheduling grants from the RBS, the scheduling information comprising information specifically intended for the UE.

The UE receives 410 information regarding a base sequence and a first phase rotation speed of the base sequence in the frequency domain. Base sequences are cell-specific in Rel-8/9/10 and they are a function of the cell-ID. Different base sequences are semi-orthogonal. The RS for a given UE is only transmitted on the same bandwidth of PUSCH and the base sequence is correspondingly generated so that the RS signal is a function of the PUSCH bandwidth. CS is a method to achieve orthogonality based on cyclic time shifts (which correspond to phase rotations in frequency domain), under certain propagation conditions, among RSs generated from the same base sequence.

Then UE then determines 420 an order, L, of the IFDMA, indicating a spacing between subcarriers over which the base sequence is to be mapped in the frequency domain. The UE will generate RSs having a length corresponding to M/L, where M is the number of subcarriers corresponding to the transmission bandwidth. The M/L length RSs are then mapped to every L:th subcarrier at the input of an OFDM modulator. The mapping of the RSs to every L:th subcarrier can be seen as a comb, where the different subcarriers correspond to the protrusions, spikes or pegs of the comb. M is the number of subcarriers corresponding to the number of spikes of the comb. Merely as an example, when L=2 then every other subcarrier is used, i.e. L−1 unused subcarriers in between each used subcarrier.

The UE generates 430 a RS-specific second phase rotation speed of the base sequence in the frequency domain based on a CS pseudo random offset. The CS pseudo random offset is generated by the UE according to a predefined pseudo-random pattern generator. Such pseudo random pattern generator is configured by combining different parameters signalled by the RBS to the UE.

Then the UE increases 440 at least the second phase rotation speed of the base sequence in the frequency domain based on the order of the IFDMA, L. The contribution to the RS phase rotation speed due to the CS pseudo random offset applied to the IFDMA reference signal is thus scaled by the order of a comb factor for the IFDMA, the comb factor corresponding to L.

Then, the UE combines 450 the first and the increased second phase rotation speeds of the base sequence in the frequency domain to obtain a third phase rotation speed and performs 460 phase rotation of the base sequence based on the third phase rotation speed. Several parameters may contribute to the phase rotation term, CS. At least the CS corresponding to the CS pseudo random offset should be scaled according to the comb factor L. However, also other parameters, such as e.g. a CS value signalled to the UE, may be scaled by the comb factor or other factor, provided that such factor is constant in all slots of a subframe.

The UE further maps 470 the phase rotated base sequence to every L:th subcarrier of the RSs, and transmits 480 the RSs.

The method performed by the UE may have several advantages. One advantage is that RS orthogonality between legacy UEs (not supporting IFDMA) and UEs supporting IFDMA may be achieved.

According to an embodiment, the phase shift applied to the base sequence to generate the corresponding phase rotation is a function of the sample index of the base sequence.

According to yet an embodiment, the RSs are defined as $r(n)=e^{j\alpha n}\bar{r}(n)$, where n is a value between 0 and M/L−1, where M is the number of scheduled subcarriers of a transmission bandwidth, $\alpha$ is a coefficient generating the phase shift in the frequency domain due to the CS of the third phase rotation speed, L is the IFDMA order for the RS and $\bar{r}(n)$ is a corresponding base sequence.

The cyclic shift due to $\alpha$ in a slot $n_s$ is given as $$\alpha = \frac{L 2\pi n_{cs,\lambda}}{12}$$

with $$n_{cs,\lambda} = (n_{DMRS}^{(1)} + n_{DMRS,\lambda}^{(2)} + n_{PN}(n_s)) \bmod 12,$$

where L represents the comb factor, or the order of the IFDMA, $n_{PN}(n_s)$ is a legacy CS hopping for slot $n_s$, $\lambda$ is represents a layer which means that there may be different CS per layer. $\lambda \in \{0, 1, \ldots, v-1\}$, where v is a base sequence number within a base sequence group in slot $n_s$. The other parameters are described in table 1 and 2 of FIG. 4b and also in 3GPP, 36.211, Physical Channels and Modulation, Release 10. It should be noted that the term $n_{PN}(n_s)$ is slot-specific while the other contributions to CS $\alpha$ are constant in all slots of a subframe. In this example, the phase rotation speed due to parameters and $n_{DMRS}^{(1)}$ and $n_{DMRS}^{(2)}$ is not increased.

Increasing the CS by a factor L enables orthogonality with respect to legacy UEs not supporting IFDMA.

Another embodiment is based on an alternative CS allocation formula for DMRS. The PUSCH demodulation reference signal sequence r(n) associated with a given layer is defined as $r(n)=e^{j(\alpha+L\gamma)n}\bar{r}(n)$, where $0 \leq n \leq M$, and M is the length of the reference signal before being mapped to the comb-spaced subcarriers, $\alpha$ is the coefficient generating the phase shift due to the CS and $\bar{r}(n)$ is the corresponding base sequence. An OCC may optionally be applied to the signal r(n). Also here, the cyclic shift due to $\alpha$ in a slot $n_s$ is given as $$\alpha = \frac{L 2\pi n_{cs,\lambda}}{12}$$

with $$n_{cs,\lambda} = (n_{DMRS}^{(1)} + n_{DMRS,\lambda}^{(2)} + n_{PN}(n_s)) \bmod 12,$$

where L represents the comb factor, or the order of the IFDMA, $n_{PN}(n_s)$ is a legacy CS hopping for slot $n_s$, $\lambda$ is represents a layer which means that there may be different CS per layer. $\lambda \in \{0, 1, \ldots, v-1\}$, where v is a base sequence number within a base sequence group in slot $n_s$. The other parameters are described in table 1 and 2 of FIG. 4b and also in 3GPP, 36.211, Physical Channels and Modulation, Release 10. It should be noted that the term $n_{PN}(n_s)$ is slot-specific while the other contributions to CS α are constant in all slots of a subframe. In this example, the phase rotation speed due to parameters $n_{DMRS}^{(1)}$ and $n_{DMRS,\lambda}^{(2)}$ is not increased.

Both the example of above, i.e. $r(n)=e^{j\alpha n}\bar{r}(n)$ and $r(n)=e^{j(\alpha+L\gamma)n}\bar{r}(n)$, allows or enables DMRS orthogonality between legacy UEs and UEs employing IFDMA on DMRS.

According to an embodiment, the method further comprises increasing (445) the first phase rotation speed.

Several parameters may contribute to the phase rotation term, CS. At least the CS corresponding to the CS pseudo random offset should be scaled according to the comb factor L. However, also other parameters, such as e.g. a CS value signalled to the UE, may be scaled by the comb factor or other factor, provided that such factor is constant in all slots of a subframe. In one example, the first phase rotation speed, i.e. the phase rotation speed of the base sequence in the frequency domain which is received from the RBS.

According to still an embodiment, the second phase rotation speed is based at least partly on a hopping pattern, CSH, which is determined by the RBS, the hopping pattern corresponding to the pseudo random offset.

The signalling to the UE comprises information about the CS hopping pattern and the signalling comprises an initialisation from the RBS to the UE. The UE then generates the pattern itself. The CS hopping pattern or CSH pattern is cell-specific. A different CS pseudo random offset is in general applied in each slot and it is known at both UE and RBS sides, so that it can be compensated at the receiver side during channel estimation. The CSH or pseudo-random CS offset is combined with the signalled UE-specific CS offset for each slot and a modulo-12 operation is performed in order to avoid exceeding the maximum phase rotation speed. CS randomization is always enabled and generates random cell-specific CSH or CS pseudo random offsets per slot. The CSH or CS pseudo-random offset is a function of the cell-ID and is thus cell-specific. The CSH is an example of a pseudo-random offset.

According to an embodiment, the method further comprises employing 465 an Orthogonal Cover Code, OCC, on RSs of the subframe to be transmitted after performing 460 phase rotation of the base sequence based on the third phase rotation speed.

The UE uses one OCC per subframe that spans all the RSs, i.e. all the slots. OCC is a multiplexing technique based on orthogonal time domain codes, operating on the 2 RSs provided for each UL subframe. The OCC code [1-1] is able to suppress an interfering RSs as long as its contribution after the RBS matched filter is identical on both RSs of the same subframe. Similarly, the OCC code [1 1] is able to suppress an interfering RS as long as its contribution after the RBS matched filter has opposite sign respectively on the two RSs of the same subframe. The OCC is used to orthogonalize the RSs.

In still an embodiment, the RSs are Demodulation Reference Signals, DMRSs.

According to yet an embodiment, a slot of the subframe comprises one RS.

A subframe may be divided into two or more slots, wherein each slot comprises one RS.

According to an embodiment, combining 450 the first and the increased second phase rotation speeds of the base sequence in the frequency domain comprises performing a modulo 12 operation on the first and the increased second phase rotation speeds of the base sequence in the frequency domain.

Embodiments herein also relate to a method performed by an RBS, operable in a wireless communication system employing OFDM, for receiving a subframe comprising at least two RSs, from a UE, the wireless communication system employing Cyclic Shift, CS, in a frequency domain, the UE supporting IFDMA. Such a method will now be described with reference to FIG. 5.

Figure 5:
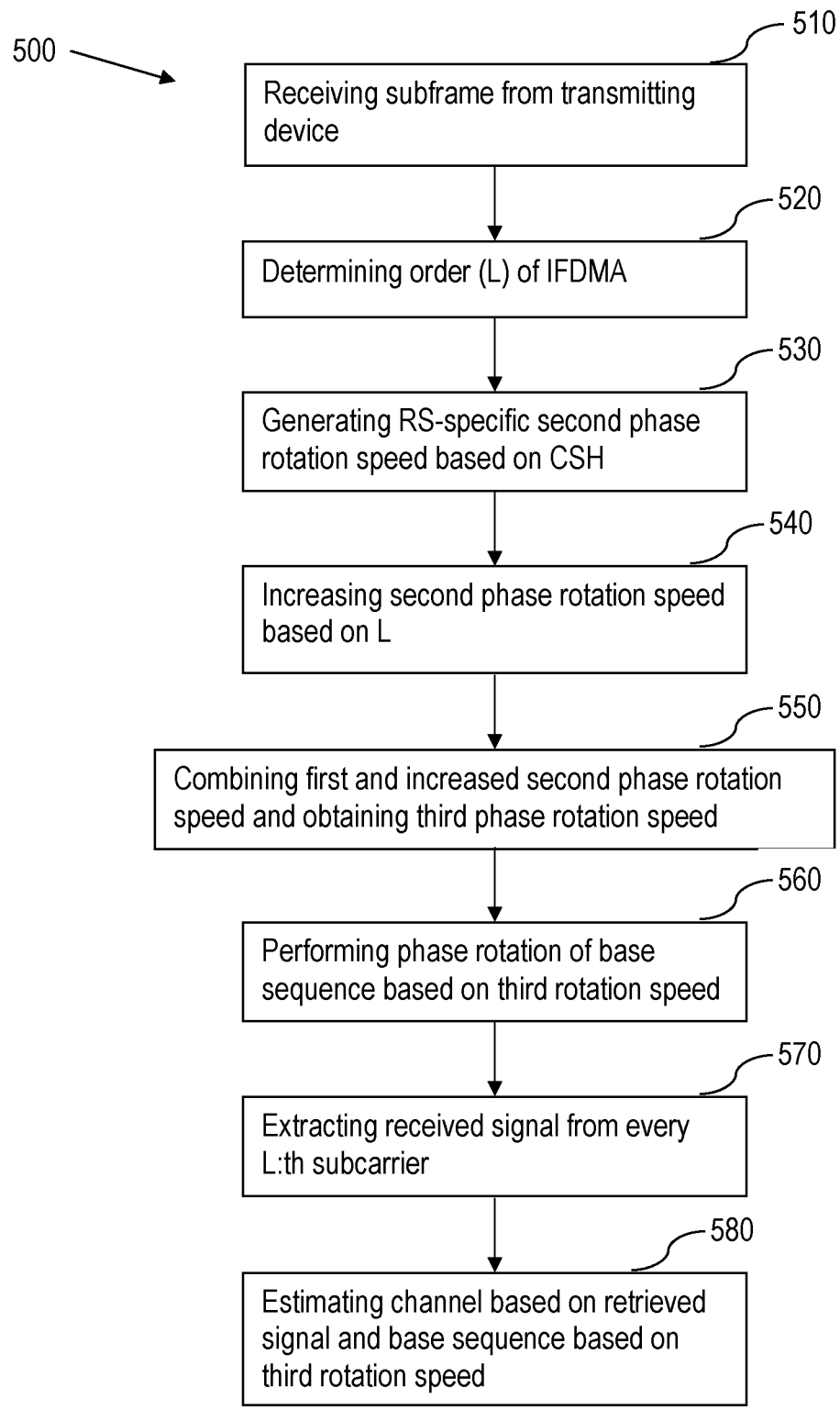
FIG. 5 is a flowchart of a method performed by an RBS for receiving a subframe comprising at least two RSs, from a UE employing IFDMA according to an exemplifying embodiment.

FIG. 5 illustrates the method 500 comprising receiving 510 the subframe from the UE; and determining 520 an order, L, of the IFDMA, indicating a spacing between subcarriers over which the base sequence has been mapped in the frequency domain. The method further comprises generating 530 a RS-specific second phase rotation speed of the base sequence in the frequency domain based on a CS pseudo random offset; and increasing 540 at least the second phase rotation speed of the base sequence in the frequency domain based on the order of the IFDMA, L. The method also comprises combining 550 the first and the increased second phase rotation speeds of the base sequence in the frequency domain to obtain a third phase rotation speed, and performing 560 phase rotation of the base sequence based on the third phase rotation speed. Still further, the method comprises extracting 570 the received signal from every L:th subcarrier, and estimating 580 the channel based on the retrieved received signal and the base sequence based on the third phase rotation speed.

The RBS receives the subframe from the UE and determines 520 an order, L, of the IFDMA, indicating a spacing between subcarriers over which the base sequence has been mapped in the frequency domain in, or by, the UE. The UE has generated RSs having a length corresponding to M/L, where M is the number of subcarriers corresponding to the transmission bandwidth. The M/L length RSs has then been mapped to every L:th subcarrier at the input of an OFDM modulator. The mapping of the RSs to every L:th subcarrier can be seen as a comb, where the different subcarriers correspond to the protrusions, spikes or pegs of the comb. M is the number of subcarriers corresponding to the number of spikes of the comb. Merely as an example, when L=2 then every other subcarrier is used, i.e. L−1 unused subcarriers in between each used subcarrier.

The RBS generates 530 an RS-specific second phase rotation speed of the base sequence in the frequency domain based on a CS pseudo random offset.

Then the RBS increases 540 at least the second phase rotation speed of the base sequence in the frequency domain based on the order of the IFDMA, L. The contribution to the RS phase rotation speed due to the CS pseudo random offset applied to the IFDMA reference signal is thus scaled by the order of a comb factor for the IFDMA, the comb factor corresponding to L.

Then, the RBS combines 550 the first and the increased second phase rotation speeds of the base sequence in the frequency domain to obtain a third phase rotation speed and performs 560 phase rotation of the base sequence based on the third phase rotation speed. Several parameters may contribute to the phase rotation term, CS. At least the CS corresponding to the CS pseudo random offset should be scaled according to the comb factor L. However, also other parameters, such as e.g. a CS value may be scaled by the comb factor or other factor, provided that such factor is constant in all slots of a subframe.

The RBS further extracts 570 the received signal from every L:th subcarrier, and estimates 580 the channel based on the retrieved received signal and the base sequence based on the third phase rotation speed.

The method in the RBS may have several advantages. One advantage is that RS orthogonality between legacy UEs (not supporting IFDMA) and UEs supporting IFDMA may be achieved.

Embodiments herein also relate to a UE adapted for transmitting a subframe comprising at least two RSs to an RBS. The UE is operable in a wireless communication system employing OFDM and the UE supports IFDMA. The wireless communication system employs Cyclic Shift, CS. The UE has the same technical features, objects and advantages as the method performed by the UE. The UE will be described in brief in order to avoid unnecessary repetition.

Figure 6:
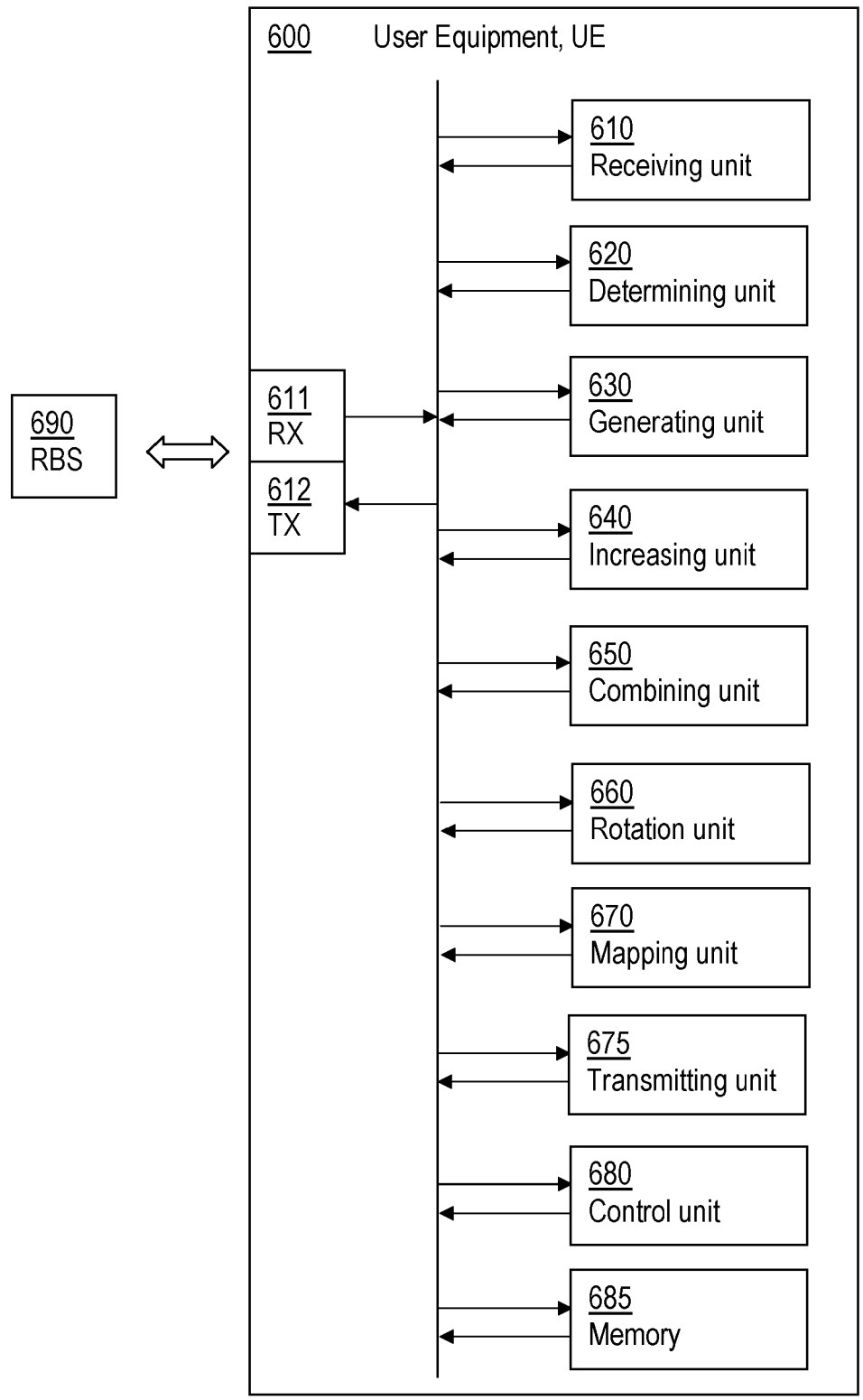
FIG. 6 is a block diagram of a UE adapted for transmitting a subframe comprising at least two RSs to an RBS, according to an exemplifying embodiment.

FIG. 6 is a block diagram of a UE 600 adapted for transmitting a subframe comprising at least two RSs to an RBS, according to an exemplifying embodiment. FIG. 6 illustrates the UE 600 comprising a receiving unit 610 adapted to, for each RS of the subframe to be transmitted, receive from the RBS, information regarding a base sequence and a first phase rotation speed of the base sequence in the frequency domain. The UE 600 further comprises a determining unit 620 adapted to determine an order, L, of the IFDMA, indicating a spacing between subcarriers over which the base sequence is to be mapped in the frequency domain; and a generating unit 630 adapted to generate a RS-specific second phase rotation speed of the base sequence in the frequency domain based on a CS pseudo random offset. The UE 600 also comprises an increasing unit 640 adapted to increase at least the second phase rotation speed of the base sequence in the frequency domain based on the order of the IFDMA, L; and a combining unit 650 adapted to combine the first and the increased second phase rotation speeds of the base sequence in the frequency domain to obtain a third phase rotation speed. The UE 600 further comprises a phase rotation unit 660 adapted to perform phase rotation of the base sequence based on the third phase rotation speed; and a mapping unit 670 adapted to map the phase rotated base sequence to every L:th subcarrier of the RSs. The UE 600 also comprises a transmitting unit 675 adapted to transmit the RSs.

The UE has the same advantages and the method performed by the UE. One advantage is that RS orthogonality between legacy UEs (not supporting IFDMA) and UEs supporting IFDMA may be achieved.

According to an embodiment, the phase shift applied to the base sequence to generate the corresponding phase rotation is a function of the sample index of the base sequence.

According to still an embodiment, the RSs are defined as $r(n)=e^{jan}\bar{r}(n)$, where n is a value between 0 and M/L−1, where M is the number of scheduled subcarriers of a transmission bandwidth, a is a coefficient generating the phase shift in the frequency domain due to the CS of the third phase rotation speed, L is the IFDMA order for the RS and $\bar{r}(n)$ is a corresponding base sequence.

According to yet an embodiment, the increasing unit 640 further is adapted to increase the first phase rotation speed.

According to an embodiment, the second phase rotation speed is based at least partly on a hopping pattern, CSH, which is determined by the RBS, the hopping pattern corresponding to the pseudo random offset.

According to still an embodiment, the UE further comprises an OCC unit adapted to employ an OCC on RSs of the subframe to be transmitted after the phase rotation unit 660 has performed phase rotation of the base sequence based on the third phase rotation speed.

According to yet an embodiment, the RSs are Demodulation Reference Signals, DMRSs.

According to an embodiment, a slot of the subframe comprises one RS.

According to still an embodiment, the combining unit 650 is adapted to combine the first and the increased second phase rotation speeds of the base sequence in the frequency domain by performing a modulo 12 operation on the first and the increased second phase rotation speeds of the base sequence in the frequency domain.

Embodiments herein also relate to an RBS operable in a wireless communication system employing OFDM, adapted for receiving a subframe comprising at least two RSs from a UE, the wireless communication system employing Cyclic Shift, CS, in a frequency domain, the UE supporting IFDMA. The RBS has the same technical features, objects and advantages as the method performed by the RBS. The RBS will be described in brief in order to avoid unnecessary repetition.

Figure 7:
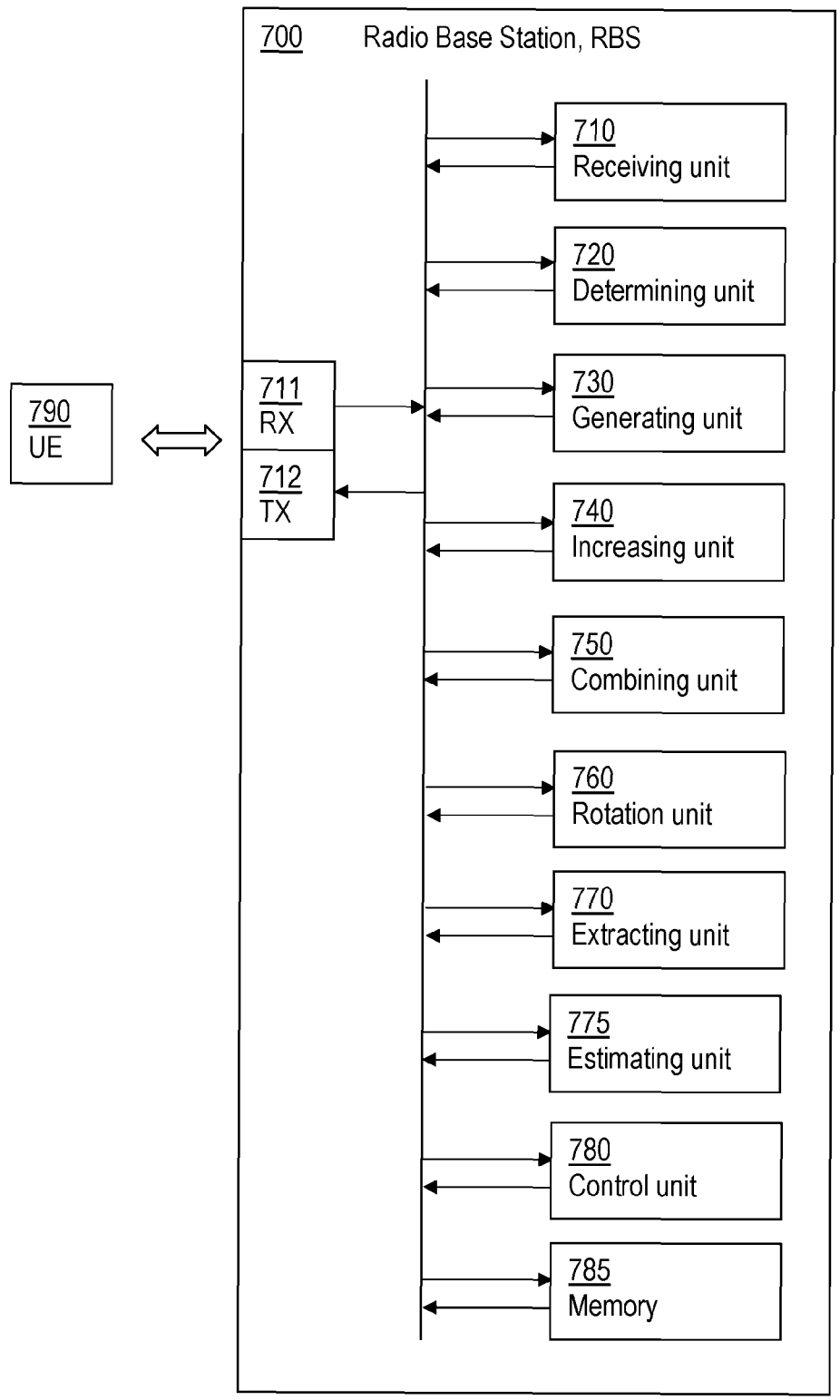
FIG. 7 is a block diagram of an RBS adapted for receiving a subframe comprising at least two RSs, from a UE employing IFDMA according to an exemplifying embodiment.

FIG. 7 is a block diagram of an RBS adapted for receiving a subframe comprising at least two RSs, from a UE employing IFDMA according to an exemplifying embodiment. FIG. 7 illustrates the RBS comprising a receiving unit 710 adapted to receive the subframe from the UE; and a determining unit 720 adapted to determine an order, L, of the IFDMA, indicating a spacing between subcarriers over which the base sequence has been mapped in the frequency domain. The RBS further comprises a generating unit 730 adapted to generate a RS-specific second phase rotation speed of the base sequence in the frequency domain based on a CS pseudo random offset. The RBS 700 also comprises an increasing unit 740 at least the second phase rotation speed of the base sequence in the frequency domain based on the order of the IFDMA, L; and a combining unit 750 adapted to combine the first and the increased second phase rotation speeds of the base sequence in the frequency domain to obtain a third phase rotation speed. Still further, the RBS 700 comprises a phase rotation unit 760 adapted to perform phase rotation of the base sequence based on the third phase rotation speed; and a retrieving unit 770 adapted to extract the received signal from every L:th subcarrier. The RBS 700 also comprises an estimating unit 775 adapted to estimate the channel based on the retrieved received signal and the base sequence based on the third phase rotation speed.

The RBS has the same advantages as the method performed by the RBS. One advantage is that RS orthogonality between legacy UEs (not supporting IFDMA) and UEs supporting IFDMA may be achieved.

Figure 9:
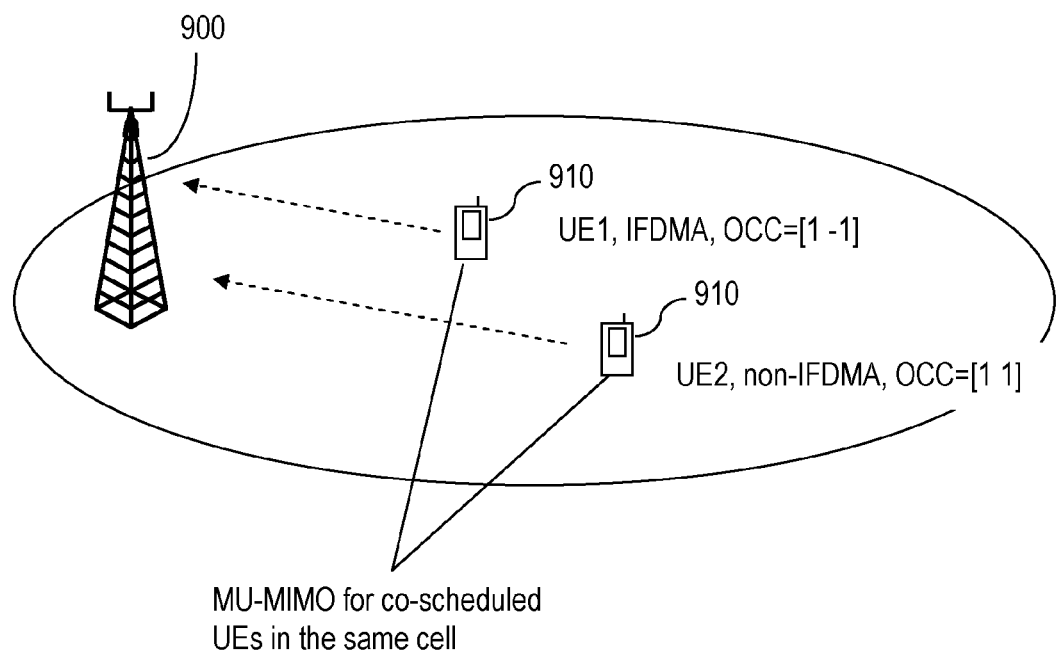
FIG. 9 is an illustration of an RBS communicating with two UEs, one supporting IFDMA and one not supporting IFDMA.

Even though the described embodiments and examples may be implemented in any appropriate type of telecommunication system which supports any suitable communication standards and which is based on any combination of suitable components, particular embodiments of the described solutions may be implemented in an LTE network, such as the one illustrated in FIG. 9, where an IFDMA UE, UE 1 is co-scheduled with a legacy, non IFDM UE, UE 2.

The example network may further include any additional elements suitable to support communication between wireless devices or between a wireless device and another communication device, such as e.g. a landline telephone. Although such a wireless device may represent a communication device that includes any suitable combination of hardware and/or software, such a wireless device may, in particular embodiments, represent a device such as the exemplified wireless device 600 illustrated in greater detail by FIG. 6. Similarly, although the illustrated network node or RBS of FIG. 9 may represent a network node or RBS that includes any suitable combination of hardware and/or software, this network nodes may, in particular embodiments, represent a device such as the example network node 700 illustrated in greater detail by FIG. 7.

As shown in FIG. 6, the example IFDMA enabled wireless device, UE 600, includes processing circuitry by means of a control unit 680, a memory 685, radio circuitry 611/612, and at least one antenna (not shown). The radio circuitry 611/612 may comprise RF circuitry and baseband processing circuitry (not shown). In particular embodiments, some or all of the functionality described above as being provided by mobile communication devices, or other forms of wireless devices, may be provided by the processing circuitry or control unit 680 executing instructions stored on a computer-readable medium, such as the memory 685 shown in FIG. 6. Alternative embodiments of the wireless device 600 may include additional components beyond those shown in FIG. 6 that may be responsible for providing certain aspects of the wireless device's functionality, including any of the functionality described above and/or any functionality necessary to support the solution described above.

As shown in FIG. 6, the processing circuitry or control unit 680 may be configured to generate DMRS by means of base sequence randomization and CS randomization which enables OCC orthogonality with respect to legacy UEs, as has been described above. The DMRS are transmitted by the Tx antenna or antennas via a TX chain (corresponding to radio circuitry 612).

As shown in FIG. 7, the RBS 700 includes processing circuitry or control unit 780, a memory 785, radio circuitry 711/712, and at least one antenna (not shown). The processing circuitry or control unit 780 may comprise RF circuitry and baseband processing circuitry (not shown). In particular embodiments, some or all of the functionality described above as being provided by a mobile base station, a base station controller, a relay node, a NodeB, an enhanced NodeB, and/or any other type of mobile communications node may be provided by the processing circuitry or control unit 780 executing instructions stored on a computer-readable medium, such as the memory 785 shown in FIG. 7. Alternative embodiments of the RBS or network node 700 may include additional components responsible for providing additional functionality, including any of the functionality identified above and/or any functionality necessary to support the solution described above. As shown in FIG. 7, the RBS 700 is configured to estimate the channel of wireless device UE 790 by means of a DMRS received via the Rx antenna and Rx chain (corresponding to radio circuitry 711). The processing circuitry or control unit 780 is configured to perform the channel estimation based on a matched filter.

Figure 8:
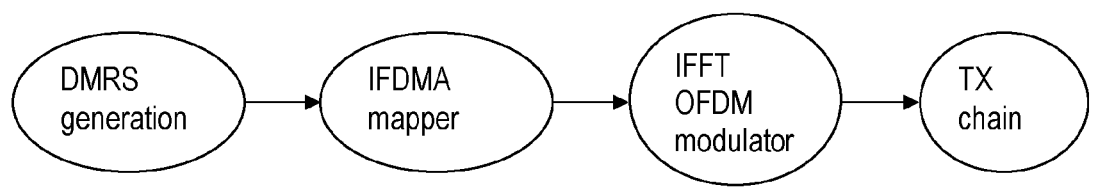
FIG. 8 is an illustration of an example of a method performed by a UE supporting IFDMA for transmitting RSs.

FIG. 8 is a simplified illustration of an example of a method performed by a UE supporting IFDMA for transmitting RSs. FIG. 8 illustrates the UE generating DMRSs, wherein the DRMSs are generated as described above in conjunction with FIG. 4a. The generated DMRSs are then mapped, also at previously described above, to subcarriers by means of e.g. an IFDMA mapper. Thereafter, the UE is ready to transmit the RSs and hence the mapped DMRSs are forwarded to an OFDMA modulator which comprises an IFFT module or unit and then the slot or subframe is transmitted, which is illustrated in FIG. 8 by the TX chain.

Figure 10:
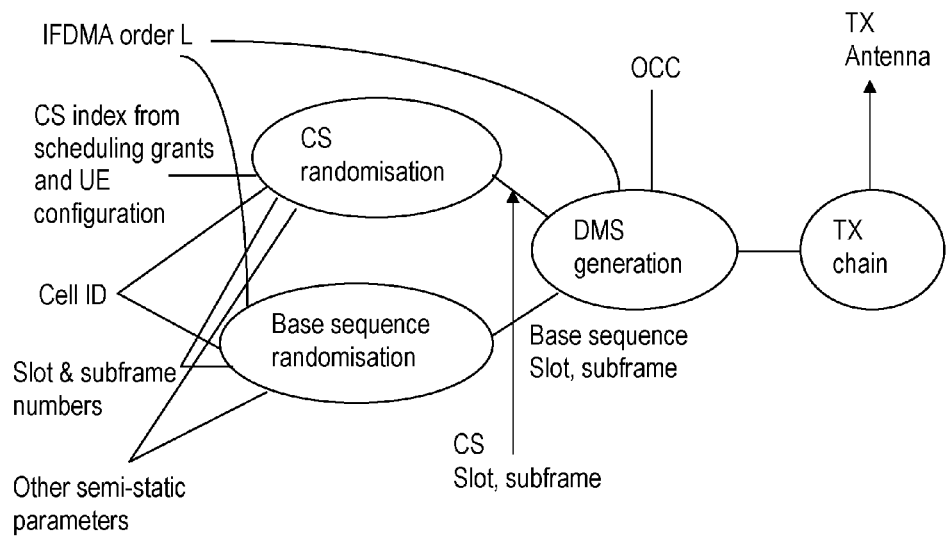
FIG. 10 is another example of a method performed by a UE supporting IFDMA for transmitting RSs.

FIG. 10 is another example of a method performed by a UE supporting IFDMA for transmitting RSs. FIG. 10 illustrates that in order to generate DMRSs, both CS randomisation and base sequence randomisation are needed. DMRSs in LTE are generated from base sequences and an individual DM RS is transmitted in each slot of a subframe. A slot-specific phase rotation in frequency domain and an OCC is applied per slot. The phase rotation corresponds to a cyclic shift in time domain, and it is thus often termed as CS in the LTE terminology. The CS is due to the sum of terms that are constant over the slots of a subframe and other terms, related to CS hopping, that are applied in a slot-specific fashion.

Figure 1:
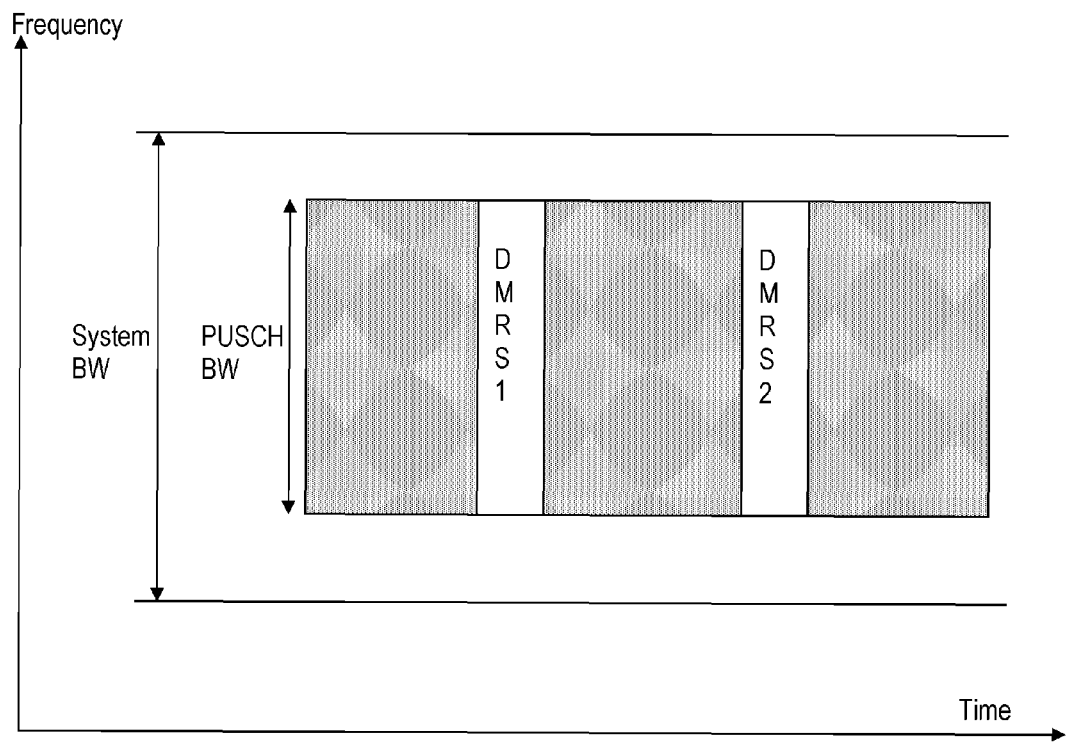
FIG. 1 is an illustration of an example of a subframe transmitted from a UE.
Figure 2:
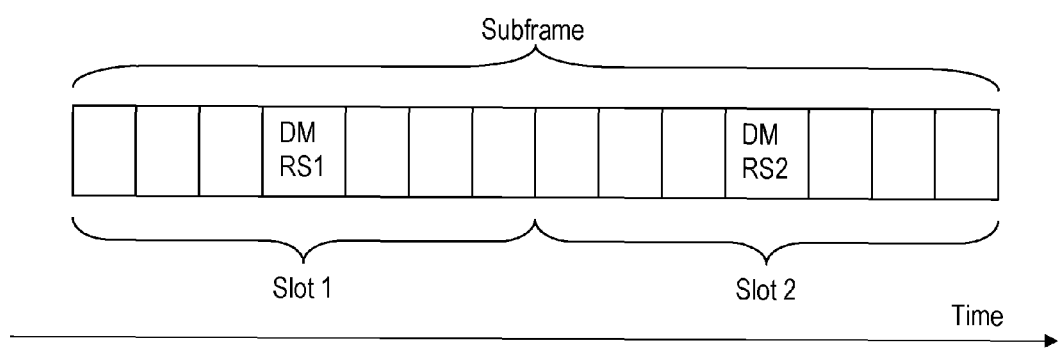
FIG. 2 is another illustration of an example of a subframe transmitted from a UE.
Figure 3:
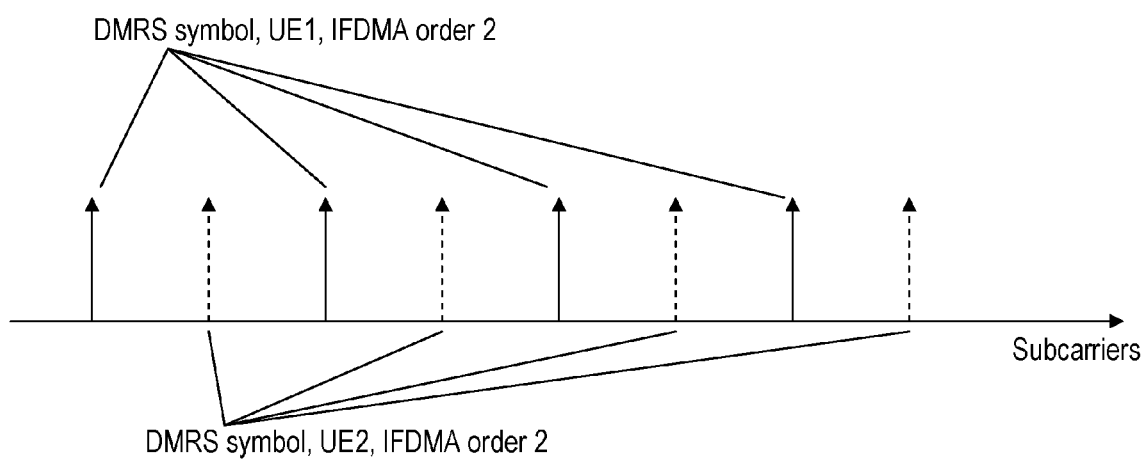
FIG. 3 is a schematic illustration of IFDMA RS multiplexing of two IFDMA enabled UEs, UE1 and UE2 applying IFDMA of order 2.

Consider, e.g. the case where two UEs are co-scheduled on partly overlapping bandwidth. As an example from prior art, consider the case where UE1 and UE2 belong to the same cell. Assume, without limiting the generality of the concept described herein, different OCC values are assigned to the UEs and that UE1 is not employing IFDMA, while UE2 employs L-order IFDMA, i.e., DMRS are mapped to each L:th subcarrier in a comb fashion. FIG. 3 is a schematic illustration of IFDMA RS multiplexing of two IFDMA UEs, UE1 and UE2.

A straightforward implementation of UE2 is based on the generation of an M/L length DMRS according to existing LTE procedures for generating such DMRS, where M is the number of subcarriers corresponding to the transmission bandwidth. The M/L length DMRS is then mapped to every L:th subcarrier at the input of the OFDM modulator. This process, applied at the transmitter side of UE2, is schematically illustrated in FIG. 8.

It is observed here that mapping a signal to every L:th subcarrier corresponds to reducing the frequency domain phase rotation speed of the signal by a factor L.

Figure 11:
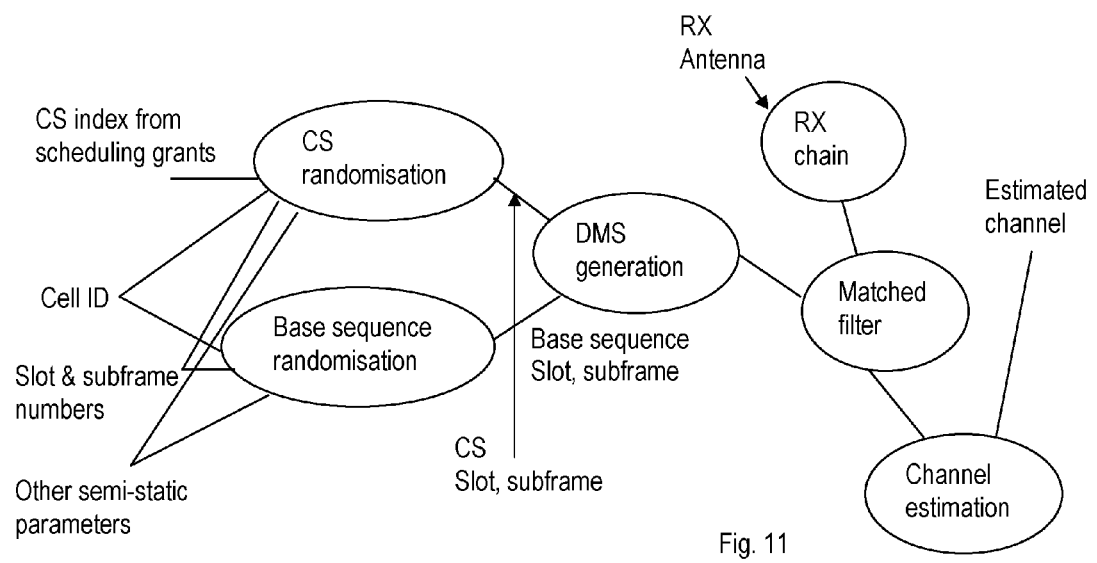
FIG. 11 is another example of a method performed by an RBS for receiving a subframe comprising at least two RSs, from a UE employing IFDMA.

FIG. 11 is another example of a method performed by an RBS for receiving a subframe comprising at least two RSs, from a UE employing IFDMA.

FIG. 11 illustrates the RBS receiving a transmission from the UE by means of the RX chain. The RBS also performs a channel estimation on the channel. The information obtained from the received transmission and the channel estimation is forwarded to a matched filter. The RBS typically compensates for the CS applied at the UE by performing a matched filtering operation in the channel estimator. In order for OCC to be effective in orthogonalising RSs of UEs in the cell of the RBS, it is necessary that the same relative CS difference between slots is present in both UEs (in the example of two UEs being co-scheduled on at least partly overlapping bandwidth. However, since IFDMA is applied to only one of the UEs and the CS is effectively reduced by a factor L for such UE, OCC results to be ineffective. The RBS will be able to retrieve the RSs of UEs employing IFDMA by performing the matched filter operation.

Thus, the concept suggested in this disclosure consists of scaling the phase rotation speed associated to the pseudo-random CS hopping pattern in case of IFDMA modulated RS in a way that allows orthogonalization of the IFDMA RSs, i.e. RSs transmitted from a UE employing IFDMA, and the non-IFDMA (legacy) RSs, i.e. RSs from a UE not employing or supporting IFDMA. Legacy RSs are generated, e.g., by UEs in the network which do not support transmission of IFDMA RS. An example of a legacy UE is a UE from a release previous to the introduction of IFDMA. The suggested concept allows orthogonality by means of, e.g., OCC.

In order to enable OCC orthogonality, the phase rotation speed associated to the legacy CS hopping pattern is modified according to the IFDMA comb factor. In an example embodiment, the contribution to the RS phase rotation speed due to the CS hopping pattern applied to the IFDMA reference signal is scaled by the order of the comb factor for the IFDMA RS. It should be noted that several parameters may contribute to the phase rotation term (CS). According to the suggested concept, it is necessary that at least the phase rotation term corresponding to the CS hopping pattern is scaled according to the comb-factor. Nevertheless, the advantages of the suggested concept may still be achieved also in the case that other parameters (such as e.g. the CS value signalled to the UE) are scaled by the comb factor or any other factor, provided that such factor is constant in all slots of a subframe.

In FIG. 6, the UE 600 is also illustrated comprising a receiving unit 611 and a transmitting unit 612. Through these two units, the UE 600 is adapted to communicate with other nodes and/or entities in the wireless communication network. The receiving unit 611 may comprise more than one receiving arrangement. For example, the receiving unit may be connected to both a wire and an antenna, by means of which the UE 600 is enabled to communicate with other nodes and/or entities in the wireless communication network. Similarly, the transmitting unit 612 may comprise more than one transmitting arrangement, which in turn are connected to both a wire and an antenna, by means of which the UE 600 is enabled to communicate with other nodes and/or entities in the wireless communication network. The UE 600 further comprises a memory 670 for storing data. Further, the UE 600 is illustrated comprising a control or processing unit 660 which in turns is connected to the different units 610-685. It shall be pointed out that this is merely an illustrative example and the UE 600 may comprise more, less or other units or modules which execute the functions of the UE 600 in the same manner as the units illustrated in FIG. 6.

It should be noted that FIG. 6 merely illustrates various functional units in the UE 600 in a logical sense. The functions in practice may be implemented using any suitable software and hardware means/circuits etc. Thus, the embodiments are generally not limited to the shown structures of the UE 600 and the functional units. Hence, the previously described exemplary embodiments may be realised in many ways. For example, one embodiment includes a computer-readable medium having instructions stored thereon that are executable by the control or processing unit 660 for executing the method steps in the UE 600. The instructions executable by the computing system and stored on the computer-readable medium perform the method steps of the UE 600 as set forth in the claims.

In FIG. 7, the RBS 700 is also illustrated comprising a receiving unit 711 and a transmitting unit 712. Through these two units, the RBS 700 is adapted to communicate with other nodes and/or entities in the wireless communication network. The receiving unit 711 may comprise more than one receiving arrangement. For example, the receiving unit may be connected to both a wire and an antenna, by means of which the RBS 700 is enabled to communicate with other nodes and/or entities in the wireless communication network. Similarly, the transmitting unit 712 may comprise more than one transmitting arrangement, which in turn is connected to both a wire and an antenna, by means of which the RBS 700 is enabled to communicate with other nodes and/or entities in the wireless communication network. The RBS 700 further comprises a memory 770 for storing data. Further, the RBS 700 is illustrated comprising a control or processing unit 780 which in turns is connected to the different units 720-785. It shall be pointed out that this is merely an illustrative example and the RBS 700 may comprise more, less or other units or modules which execute the functions of the RBS 700 in the same manner as the units illustrated in FIG. 7.

It should be noted that FIG. 7 merely illustrates various functional units in the RBS 700 in a logical sense. The functions in practice may be implemented using any suitable software and hardware means/circuits etc. Thus, the embodiments are generally not limited to the shown structures of the RBS 700 and the functional units. Hence, the previously described exemplary embodiments may be realised in many ways. For example, one embodiment includes a computer-readable medium having instructions stored thereon that are executable by the control or processing unit 760 for executing the method steps in the RBS 700. The instructions executable by the computing system and stored on the computer-readable medium perform the method steps of the RBS 700 as set forth in the claims.

Figure 12:
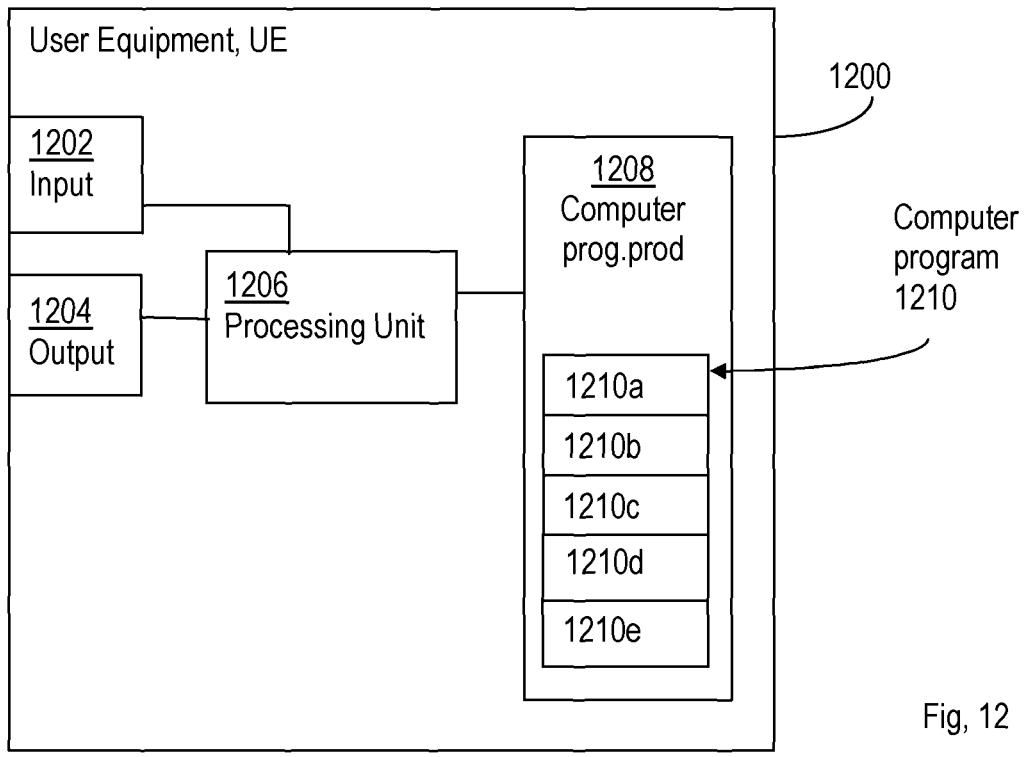
FIG. 12 is an exemplifying embodiment of a UE adapted for transmitting a subframe comprising at least two RSs to an RBS.

FIG. 12 schematically shows an embodiment of a UE 1200. Comprised in the UE 1200 are here a processing unit 1206, e.g. with a DSP (Digital Signal Processor). The processing unit 1206 may be a single unit or a plurality of units to perform different actions of procedures described herein. The UE 1200 may also comprise an input unit 1202 for receiving signals from other entities, and an output unit 1204 for providing signal(s) to other entities. The input unit and the output unit may be arranged as an integrated entity or as illustrated in the example of FIG. 6, as one or more interfaces 611/612.

Furthermore, the UE 1200 comprises at least one computer program product 1208 in the form of a non-volatile memory, e.g. an EEPROM (Electrically Erasable Programmable Read-Only Memory), a flash memory and a hard drive. The computer program product 1208 comprises a computer program 1210, which comprises code means, which when executed in the processing unit 1206 in the UE 1200 causes the UE 1200 to perform the actions e.g. of the procedure described earlier in conjunction with FIG. 4a.

The computer program 1210 may be configured as a computer program code structured in computer program modules 1210a-1210e. Hence, in an exemplifying embodiment, the code means in the computer program of the UE 1200 comprises a receiving unit, or module, for receiving, from the RBS, information regarding a base sequence and a first phase rotation speed of the base sequence in the frequency domain. The computer program further comprises a determining unit, or module, for determining an order, L, of the IFDMA, indicating a spacing between subcarriers over which the base sequence is to be mapped in the frequency domain. The computer program further comprises a generating unit, or module, for generating a RS-specific second phase rotation speed of the base sequence in the frequency domain based on a CS pseudo random offset. The computer program further comprises an increasing unit, or module, for increasing at least the second phase rotation speed of the base sequence in the frequency domain based on the order of the IFDMA, L. The computer program also comprises a combining unit, or module, for combining the first and the increased second phase rotation speeds of the base sequence in the frequency domain to obtain a third phase rotation speed. The computer program also comprises a phase rotation unit, or module, for performing phase rotation of the base sequence based on the third phase rotation speed. The computer program also comprises a mapping unit, or module, for mapping the phase rotated base sequence to every L:th subcarrier of the RSs, and a transmitting unit, or module, for transmitting the RSs.

The computer program modules could essentially perform the actions of the flow illustrated in FIG. 4a, to emulate the UE 600, 1200. In other words, when the different computer program modules are executed in the processing unit 1206, they may correspond to the units 610-685 of FIG. 6.

Figure 13:
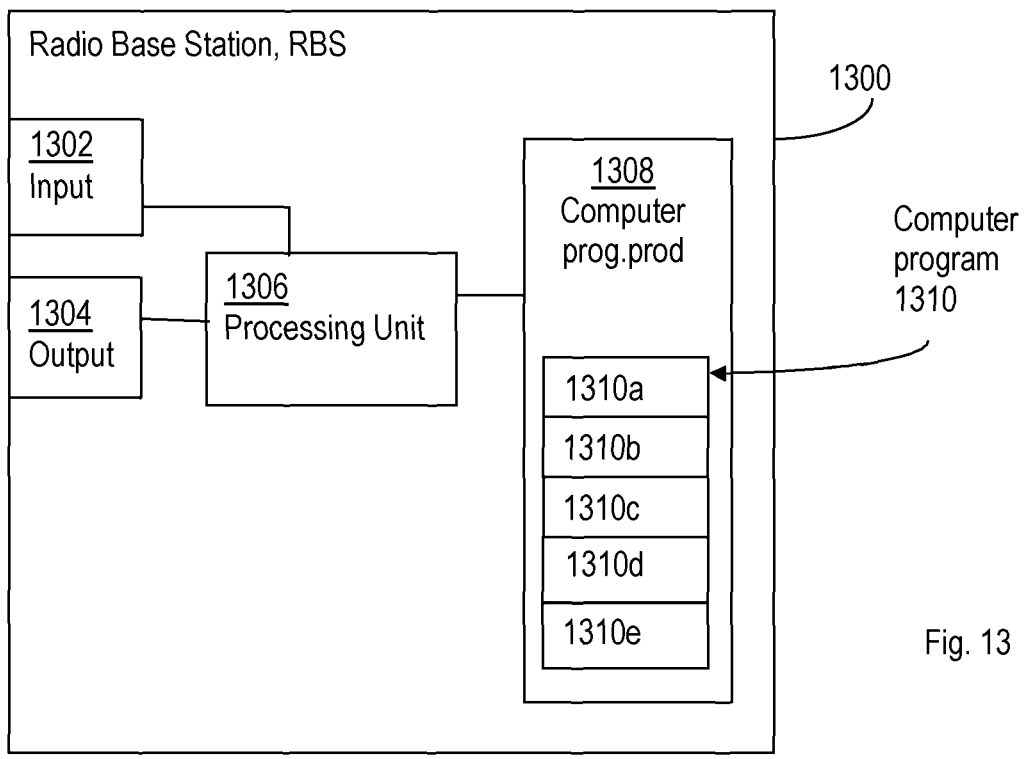
FIG. 13 is an exemplifying embodiment of an RBS adapted for receiving a subframe comprising at least two RSs, from a UE employing IFDMA.

FIG. 13 schematically shows an embodiment of an RBS 1300. Comprised in the RBS 1300 are here a processing unit 1306, e.g. with a DSP (Digital Signal Processor). The processing unit 1306 may be a single unit or a plurality of units to perform different actions of procedures described herein. The RBS 1300 may also comprise an input unit 1302 for receiving signals from other entities, and an output unit 1304 for providing signal(s) to other entities. The input unit and the output unit may be arranged as an integrated entity or as illustrated in the example of FIG. 7, as one or more interfaces 711/712.

Furthermore, the RBS 1300 comprises at least one computer program product 1308 in the form of a non-volatile memory, e.g. an EEPROM (Electrically Erasable Programmable Read-Only Memory), a flash memory and a hard drive. The computer program product 1308 comprises a computer program 1310, which comprises code means, which when executed in the processing unit 1306 in the RBS 1300 causes the RBS 1300 to perform the actions e.g. of the procedure described earlier in conjunction with FIG. 5.

The computer program 1310 may be configured as a computer program code structured in computer program modules 1310a-1310e. Hence, in an exemplifying embodiment, the code means in the computer program of the RBS 1300 comprises a receiving unit, or module, for receiving the subframe from the UE. The computer program further comprises a determining unit, or module, for determining an order, L, of the IFDMA, indicating a spacing between subcarriers over which the base sequence has been mapped in the frequency domain. The computer program further comprises a generating unit, or module, for generating a RS-specific second phase rotation speed of the base sequence in the frequency domain based on a CS pseudo random offset. The computer program further comprises an increasing unit, or module, for increasing at least the second phase rotation speed of the base sequence in the frequency domain based on the order of the IFDMA, L. The computer program also comprises a combining unit, or module, for combining the first and the increased second phase rotation speeds of the base sequence in the frequency domain to obtain a third phase rotation speed. The computer program also comprises a phase rotation unit, or module, for performing phase rotation of the base sequence based on the third phase rotation speed. The computer program also comprises an extracting unit, or module, for extracting the received signal from every L:th subcarrier, and an estimation unit, or module, for estimating the channel based on the retrieved received signal and the base sequence based on the third phase rotation speed.

The computer program modules could essentially perform the actions of the flow illustrated in FIG. 5, to emulate the RBS 1300. In other words, when the different computer program modules 1310a-1310e are executed in the processing unit 1306, they may correspond to the units 720-750 of FIG. 7.

Although the code means in the respective embodiments disclosed above in conjunction with FIGS. 12 and 13 respectively are implemented as computer program modules which when executed in the respective processing unit causes the UE and the RBS respectively to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the Network Node and the UE respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a User Equipment, UE, operable in a wireless communication system employing Orthogonal Frequency Division Multiplexing, OFDM, for transmitting a subframe comprising at least two Reference Signals, RSs, to a Radio Base Station, RBS, the wireless communication system employing Cyclic Shift, CS, the UE supporting Interleaved Frequency Domain Multiple Access, IFDMA, the method comprising for each RS of the subframe to be transmitted:

the UE receiving, from the RBS, information regarding a base sequence and a first phase rotation speed of the base sequence in the frequency domain;

the UE determining an order, L, of the IFDMA, indicating a spacing between subcarriers over which the base sequence is to be mapped in the frequency domain;

the UE generating a RS-specific second phase rotation speed of the base sequence in the frequency domain based on a CS pseudo random offset, wherein the CS pseudo random offset is generated according to a predefined pseudo random pattern generator;

the UE increasing at least the second phase rotation speed of the base sequence in the frequency domain based on the order of the IFDMA, L, wherein the second phase rotation speed of the base sequence is scaled by a comb factor corresponding to the order of the IFDMA, L, and the order, L, of the IFDMA is a non-zero integer;

the UE combining the first and the increased second phase rotation speeds of the base sequence in the frequency domain to obtain a third phase rotation speed;

the UE performing phase rotation of the base sequence based on the third phase rotation speed;

the UE mapping the phase rotated base sequence to every L:th subcarrier of the RSs, wherein the RSs are defined as:

$r(n)=e^{j\alpha n}\hat{r}(n)$, where n is a value between 0 and M/L−1, where M is the number of scheduled subcarriers of a transmission bandwidth, $\alpha$ is a coefficient generating the phase shift in the frequency domain due to the CS of the third phase rotation speed, e is a mathematical constant that is a base of a natural logarithm, j is an imaginary number, and $\hat{r}(n)$ is a corresponding base sequence; and the UE transmitting the RSs.

2. The method according to claim 1, wherein the phase shift applied to the base sequence to generate the corresponding phase rotation is a function of a sample index of the base sequence.

3. The method according to claim 1, further comprising increasing the first phase rotation speed.

4. The method according to claim 1, wherein the second phase rotation speed is based at least partly on a CS hopping pattern, CSH, which is determined by the RBS, the hopping pattern corresponding to the pseudo random offset.

5. The method according to claim 1, further comprising employing an Orthogonal Cover Code, OCC, on RSs of the subframe to be transmitted after performing phase rotation of the base sequence based on the third phase rotation speed.

6. The method according to claim 1, wherein the RSs are Demodulation Reference Signals, DMRSs.

7. The method according to claim 1, wherein a slot of the subframe comprises one RS.

8. The method according to claim 1, wherein combining the first and the increased second phase rotation speeds of the base sequence in the frequency domain comprises performing a modulo 12 operation on the first and the increased second phase rotation speeds of the base sequence in the frequency domain.

9. The method according to claim 1, wherein the pseudo random pattern generator is configured by combining different parameters signalled by the RBS to the UE.

10. A method performed by a Radio Base Station, RBS, operable in a wireless communication system employing Orthogonal Frequency Division Multiplexing, OFDM, for receiving a subframe comprising at least two Reference Signals, RSs, from a User Equipment, UE, the wireless communication system employing Cyclic Shift, CS, in a frequency domain, the UE supporting Interleaved Frequency Domain Multiple Access, IFDMA, the method comprising:

the RBS receiving the subframe comprising at least two RSs from the UE, wherein the RSs are defined as:

$r(n)=e^{j\alpha n}\hat{r}(n)$, where n is a value between 0 and M/L−1, where M is the number of scheduled subcarriers of a transmission bandwidth, $\alpha$ is a coefficient generating the phase shift in the frequency domain due to the CS of the third phase rotation speed, L is a non-zero integer indicating the IFDMA order for the RS, e is a mathematical constant that is a base of a natural logarithm, j is an imaginary number, and $\hat{r}(n)$ is a corresponding base sequence;

the RBS determining the order, L, of the IFDMA, indicating a spacing between subcarriers over which the base sequence has been mapped in the frequency domain;

the RBS generating a RS-specific second phase rotation speed of the base sequence in the frequency domain based on a CS pseudo random offset, wherein the CS pseudo random offset is generated according to a predefined pseudo random pattern generator;

the RBS increasing at least the second phase rotation speed of the base sequence in the frequency domain based on the order of the IFDMA, L, wherein the second phase rotation speed of the base sequence is scaled by a comb factor corresponding to the order of the IFDMA, L;

the RBS combining a first phase rotation speed of the base sequence in the frequency domain and the increased second phase rotation speeds of the base sequence in the frequency domain to obtain the third phase rotation speed;

the RBS performing phase rotation of the base sequence based on the third phase rotation speed;

the RBS extracting the received signal from every L:th subcarrier; and the RBS estimating the channel based on the received signal and the base sequence based on the third phase rotation speed.

11. A User Equipment, UE, operable in a wireless communication system employing Orthogonal Frequency Division Multiplexing, OFDM, and adapted for transmitting a subframe comprising at least two Reference Signals, RSs, to a Radio Base Station, RBS, the wireless communication system employing Cyclic Shift, CS, the UE supporting Interleaved Frequency Domain Multiple Access, IFDMA, the UE comprising:

a processor;

a non-transitory computer readable medium coupled to the processor, said computer readable medium containing instructions executable by the processor, whereby the processor is configured to:

receive from the RBS, for each RS of the subframe to be transmitted, information regarding a base sequence and a first phase rotation speed of the base sequence in the frequency domain;

determine an order, L, of the IFDMA, indicating a spacing between subcarriers over which the base sequence is to be mapped in the frequency domain;

generate a RS-specific second phase rotation speed of the base sequence in the frequency domain based on a CS pseudo random offset, wherein the CS pseudo random offset is generated according to a predefined pseudo random pattern generator;

increase at least the second phase rotation speed of the base sequence in the frequency domain based on the order of the IFDMA, L, wherein the second phase rotation speed of the base sequence is scaled by a comb factor corresponding to the order of the IFDMA, L, and the order, L, of the IFDMA is a non-zero integer;

combine the first and the increased second phase rotation speeds of the base sequence in the frequency domain to obtain a third phase rotation speed;

perform phase rotation of the base sequence based on the third phase rotation speed;

map the phase rotated base sequence to every L:th subcarrier of the RSs, wherein the RSs are defined as:
$r(n)=e^{j\alpha n}\hat{r}(n)$, where n is a value between 0 and M/L−1, where M is the number of scheduled subcarriers of a transmission bandwidth, α is a coefficient generating the phase shift in the frequency domain due to the CS of the third phase rotation speed, e is a mathematical constant that is a base of a natural logarithm, j is an imaginary number, and $\hat{r}(n)$ is a corresponding base sequence; and
transmit the RSs.

12. The UE according to claim 11, wherein the phase shift applied to the base sequence to generate the corresponding phase rotation is a function of a sample index of the base sequence.

13. The UE according to claim 11, wherein the processor is further configured to increase the first phase rotation speed.

14. The UE according to claim 11, wherein the second phase rotation speed is based at least partly on a CS hopping pattern, CSH, which is determined by the RBS, the hopping pattern corresponding to the pseudo random offset.

15. The UE according to claim 11, wherein the processor is further configured to employ an Orthogonal Cover Code, OCC, on RSs of the subframe to be transmitted after performing phase rotation of the base sequence based on the third phase rotation speed.

16. The UE according to claim 11, wherein the RSs are Demodulation Reference Signals, DMRSs.

17. The UE according to claim 11, wherein a slot of the subframe comprises one RS.

18. The UE according to claim 11, wherein the processor is further configured to combine the first and the increased second phase rotation speeds of the base sequence in the frequency domain by performing a modulo 12 operation on the first and the increased second phase rotation speeds of the base sequence in the frequency domain.

19. A Radio Base Station, RBS, operable in a wireless communication system employing Orthogonal Frequency Division Multiplexing, OFDM, adapted for receiving a subframe comprising at least two Reference Signals, RSs, from a User Equipment, UE, the wireless communication system employing Cyclic Shift, CS, in a frequency domain, the UE supporting Interleaved Frequency Domain Multiple Access, IFDMA, the RBS comprising:
a processor;
a non-transitory computer readable medium coupled to the processor, said computer readable medium containing instructions executable by the processor, whereby the processor is configured to:
receive the subframe comprising at least two RSs from the UE, wherein the RSs are defined as:
$r(n)=e^{j\alpha n}\hat{r}(n)$, where n is a value between 0 and M/L−1, where M is the number of scheduled subcarriers of a transmission bandwidth, α is a coefficient generating the phase shift in the frequency domain due to the CS of the third phase rotation speed, L is a non-zero integer indicating the IFDMA order for the RS, e is a mathematical constant that is a base of a natural logarithm, j is an imaginary number, and $\hat{r}(n)$ is a corresponding base sequence;
determine the order, L, of the IFDMA, indicating a spacing between subcarriers over which the base sequence has been mapped in the frequency domain;
generate a RS-specific second phase rotation speed of the base sequence in the frequency domain based on a CS pseudo random offset, wherein the CS pseudo random offset is generated according to a predefined pseudo random pattern generator;
increase at least the second phase rotation speed of the base sequence in the frequency domain based on the order of the IFDMA, L, wherein the second phase rotation speed of the base sequence is scaled by a comb factor corresponding to the order of the IFDMA, L;
combine the first and the increased second phase rotation speeds of the base sequence in the frequency domain to obtain the third phase rotation speed;
perform phase rotation of the base sequence based on the third phase rotation speed;
extract the received signal from every L:th subcarrier; and
estimate the channel based on the received signal and the base sequence based on the third phase rotation speed.

20. A non-transitory computer readable medium having instructions stored therein, which when run in a processor of a User Equipment, UE, causes the UE to implement a method, wherein the UE is operable in a wireless communication system employing Orthogonal Frequency Division Multiplexing, OFDM, and adapted for transmitting a subframe comprising at least two Reference Signals, RSs, to a Radio Base Station, RBS, the wireless communication system employing Cyclic Shift, CS, the UE supporting Interleaved Frequency Domain Multiple Access, IFDMA, the method comprising:
receiving from the RBS, for each RS of the subframe to be transmitted information regarding a base sequence and a first phase rotation speed of the base sequence in the frequency domain;
determining an order, L, of the IFDMA, indicating a spacing between subcarriers over which the base sequence is to be mapped in the frequency domain;
generating a RS-specific second phase rotation speed of the base sequence in the frequency domain based on a CS pseudo random offset, wherein the CS pseudo random offset is generated according to a predefined pseudo random pattern generator;
increasing at least the second phase rotation speed of the base sequence in the frequency domain based on the order of the IFDMA, L, wherein the second phase rotation speed of the base sequence is scaled by a comb factor corresponding to the order of the IFDMA, L, and the order, L, of the IFDMA is a non-zero integer;
combining the first and the increased second phase rotation speeds of the base sequence in the frequency domain to obtain a third phase rotation speed;
performing phase rotation of the base sequence based on the third phase rotation speed;
mapping the phase rotated base sequence to every L:th subcarrier of the RSs, wherein the RSs are defined as:
$r(n)=e^{j\alpha n}\hat{r}(n)$, where n is a value between 0 and M/L−1, where M is the number of scheduled subcarriers of a transmission bandwidth, α is a coefficient generating the phase shift in the frequency domain due to the CS of the third phase rotation speed, e is a mathematical constant that is a base of a natural logarithm, j is an imaginary number, and $\hat{r}(n)$ is a corresponding base sequence; and
transmitting the RSs.

21. A non-transitory computer readable medium having instructions stored therein, which when run in a processor of a Radio Base Station, RBS, causes the RBS to execute a method, wherein the RBS is operable in a wireless communication system employing Orthogonal Frequency Division Multiplexing, OFDM, adapted for receiving a subframe comprising at least two Reference Signals, RSs, from a User Equipment, UE, the wireless communication system employing Cyclic Shift, CS, in a frequency domain, the UE supporting Interleaved Frequency Domain Multiple Access, IFDMA, the method comprising:

receiving the subframe comprising at least two RSs from the UE, wherein the RSs are defined as:

r(n)=$e^{j\alpha n}$r̂(n), where n is a value between 0 and M/L−1, where M is the number of scheduled subcarriers of a transmission bandwidth, α is a coefficient generating the phase shift in the frequency domain due to the CS of the third phase rotation speed, L is a non-zero integer indicating the IFDMA order for the RS, e is a mathematical constant that is a base of a natural logarithm, j is an imaginary number, and r̂(n) is a corresponding base sequence;

determining the order, L, of the IFDMA, indicating a spacing between subcarriers over which the base sequence has been mapped in the frequency domain;

generating a RS-specific second phase rotation speed of the base sequence in the frequency domain based on a CS pseudo random offset, wherein the CS pseudo random offset is generated according to a predefined pseudo random pattern generator;

increasing at least the second phase rotation speed of the base sequence in the frequency domain based on the order of the IFDMA, L, wherein the second phase rotation speed of the base sequence is scaled by a comb factor corresponding to the order of the IFDMA, L;

combining the first and the increased second phase rotation speeds of the base sequence in the frequency domain to obtain the third phase rotation speed;

performing phase rotation of the base sequence based on the third phase rotation speed;

extracting the received signal from every L:th subcarrier; and estimating the channel based on the received signal and the base sequence based on the third phase rotation speed.

* * * * *